United States Patent
Wilson

(10) Patent No.: US 6,712,421 B1
(45) Date of Patent: Mar. 30, 2004

(54) EXPANDABLE CAMPER SHELL FOR A PICKUP TRUCK

(76) Inventor: Brian S. Wilson, 20613 Cohasset St., Winnetka, CA (US) 91306

( * ) Notice: Subject to any disclaimer, the term of this patent is extended or adjusted under 35 U.S.C. 154(b) by 0 days.

(21) Appl. No.: 10/371,587

(22) Filed: Feb. 21, 2003

(51) Int. Cl.[7] .................................................. B60P 3/39
(52) U.S. Cl. ................. 296/165; 296/26.04; 296/26.06; 296/37.6; 296/100.06; 296/100.14
(58) Field of Search ................................. 296/164, 165, 296/26.01, 26.04, 26.06, 100.01, 100.06, 100.07, 100.14, 37.6, 100.08, 100.1, 10

(56) References Cited

U.S. PATENT DOCUMENTS

| | | | |
|---|---|---|---|
| 3,190,689 A | | 6/1965 | Calthorpe |
| 5,213,390 A | * | 5/1993 | Borchers .................... 296/165 |
| 5,366,266 A | | 11/1994 | Harbison |
| 5,558,392 A | * | 9/1996 | Young ........................ 296/157 |
| 5,957,525 A | * | 9/1999 | Nelson ....................... 296/165 |
| 6,007,137 A | * | 12/1999 | Lambden ................ 296/100.02 |
| 6,030,026 A | * | 2/2000 | Vega et al. .................. 296/159 |
| 6,086,134 A | * | 7/2000 | Cravens et al. ......... 296/100.06 |
| 6,394,531 B2 | * | 5/2002 | Thompson et al. .......... 296/165 |
| 6,565,143 B2 | * | 5/2003 | Okamoto .................... 296/165 |

* cited by examiner

Primary Examiner—D. Glenn Dayoan
Assistant Examiner—Gregory Blankenship
(74) Attorney, Agent, or Firm—Jack C. Munro

(57) ABSTRACT

An expandable camper shell for a pickup truck which includes a cover that is to be movable from a lower position to a raised position with the cover assuming a tilted configuration relative to the bed of the pickup truck. When in the maximum raised position additional head room is provided for any individuals located within the internal compartment located between the cover and the bed. When the cover is in the maximum raised position, there is provided a gap area with this gap area to be closable by a removable, double-thickness, fabric, insert assembly. A shock strut assembly is mounted between the cover and the bed that will maintain the cover in the maximum raised position after it is manually raised.

6 Claims, 4 Drawing Sheets

EXPANDABLE CAMPER SHELL FOR A PICKUP TRUCK

BACKGROUND OF THE INVENTION

1. Field of the Invention

The present invention relates to a camper shell for a pickup truck bed where the camper shell can be moved from a lower position, which assumes a low profile during times that the pickup truck is being driven, to a maximum raised position which provides for additional head room for individuals located within the internal compartment of the bed of the truck.

2. Description of the Related Art

Many individuals, when camping, prefer a pickup truck mounted camper as opposed to a tent or a trailer that is hauled by a truck. Typically, camper shells are constructed of a hard cover that encloses the internal compartment of the bed of the pickup truck. When the pickup truck is being driven, it is desirable to have the camper shell to assume a low profile and not extend any height above the cab of the pickup truck. The reason for this is for improved aerodynamics and to significantly improve fuel mileage of the pickup truck. However, when the camper shell is being used when the pickup truck is at rest, there is provided only a limited amount of head room for the occupant or occupants of the internal compartment between the camper shell and the bed of the pickup truck.

In the past, it has been known to increase the head room of a camper shell in conjunction with a pickup truck. It has been known to raise the camper shell in some manner relative to the bed of the pickup truck with generally these types of shell raising structures being quite complicated and therefore inherently expensive. It has also been known to incorporate some type of mechanism that raises just one end of the camper shell with the camper shell assuming a tilted position relative to the bed of the pickup truck. These type of space increasing mechanisms have proved to be most desirable as they normally can be constructed to be less complicated and less expensive.

SUMMARY OF THE INVENTION

The first embodiment of the present invention relates to an expandable camper shell for a pickup truck which utilizes a sheet material cover which is mounted over the internal compartment of the bed of the pickup truck. This cover is pivotally movable by a hinge joint which is located at the tailgate portion of the bed of the pickup truck. The front edge of the cover has mounted thereon at least one shock strut which is connected between the cover and the bed. The function of the shock strut is to permit manual movement of the camper shell to a maximum raised position, and when located in the maximum raised position the shock strut will maintain the camper shell in that maximum raised position. The force of the shock strut can be easily overcome by the application of a manual force to lower the camper shell to a lower position when such is desired. When the camper shell is in the maximum raised position, there is produced a gap between the camper shell and the bed of the truck. A fabric insert assembly is to be removably mounted within this gap which is to be used to completely enclose the internal compartment providing privacy to any occupant or occupants of the internal compartment.

A further embodiment of the present invention is where the first basic embodiment is modified by there being used two in number of shock struts.

A further embodiment of the present invention is where the first basic embodiment is modified by the fabric insert assembly being removably mounted by a zipper arrangement to both the cover and the bed of the pickup truck.

A further embodiment of the present invention is where the fabric insert assembly is modified to be formed of double thickness.

A further embodiment of the present invention is where there is incorporated a flexible boot that surrounds the window that is located within the back wall of the cab of the pickup truck. This flexible boot is mounted on the cover and is movable with the cover. The opening that is provided by the flexible boot can be closed by a zippered fabric insert.

It is an object of the present invention to provide a non-complex, expandable camper shell for a pickup truck which can be easily operated by the most unskilled individual to provide a privacy enclosure while providing increased head room when the cover is in the maximum raised position.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
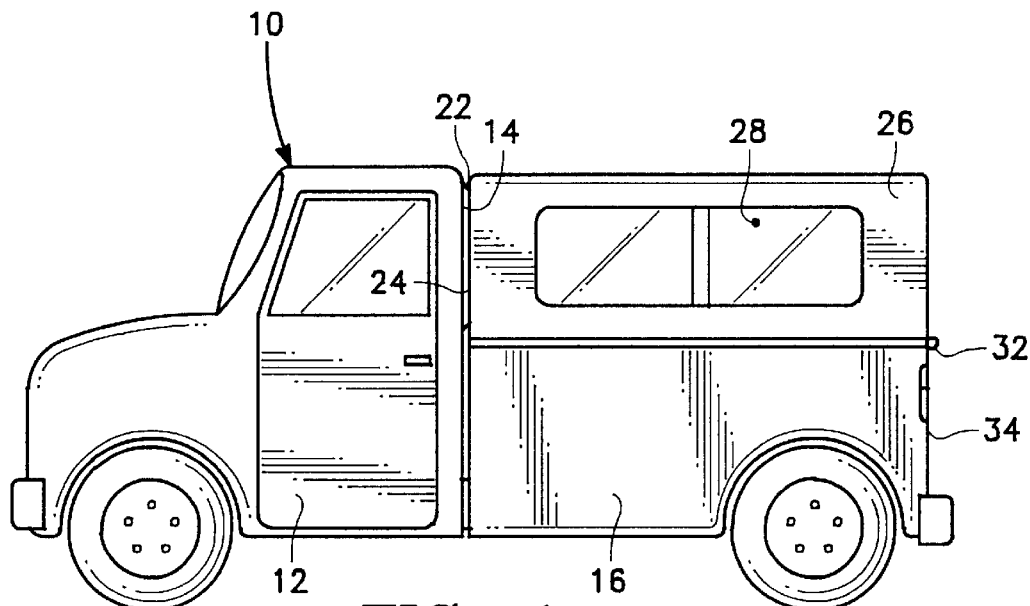
FIG. 1 is a side elevational view of a pickup truck upon which has been mounted the expandable camper shell of the present invention showing the camper shell in a lower position which is the normal position for driving of the pickup truck.

Referring particularly to the drawings, there is shown a pickup truck 10 which has a passenger cab 12 which has a rear wall 14 located directly adjacent the bed 16 of the pickup truck 10. The bed 16 includes an internal compartment 18 which is normally used to haul materials or articles. Mounted within the rear wall 14 is a window 20. The window 20 can normally be slid open by an occupant of the passenger cab 12 in order to observe and communicate with any individual or individuals that are located within the internal compartment 18. In order to prevent rain and dust from entering the window 20, there is mounted about window 20 a flexible, normally rubber, boot 22. The boot 22 is mounted on the forward wall 24 of a camper shell cover 26. Boot 22 encloses opening 41 through which access to window 20 is to occur. The cover 26 will normally be constructed of a rigid material with a fiberglass or plastic material being preferred. Mounted within each side of the cover 26 are windows, such as window 28. The cover 26 forms an interior chamber 30 which combines with and forms part of the internal compartment 18.

Figure 2:
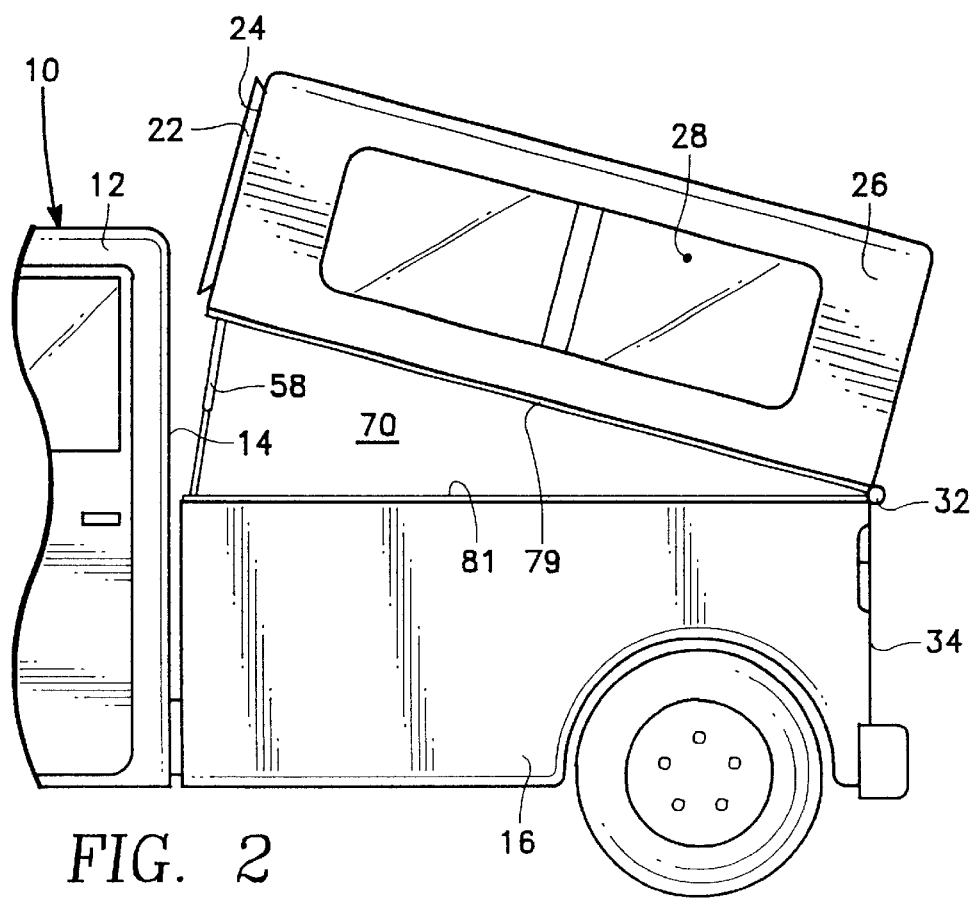
FIG. 2 is a side elevational view similar to FIG. 1 but showing the camper shell in the maximum raised position relative to the bed of the pickup truck.
Figure 3:
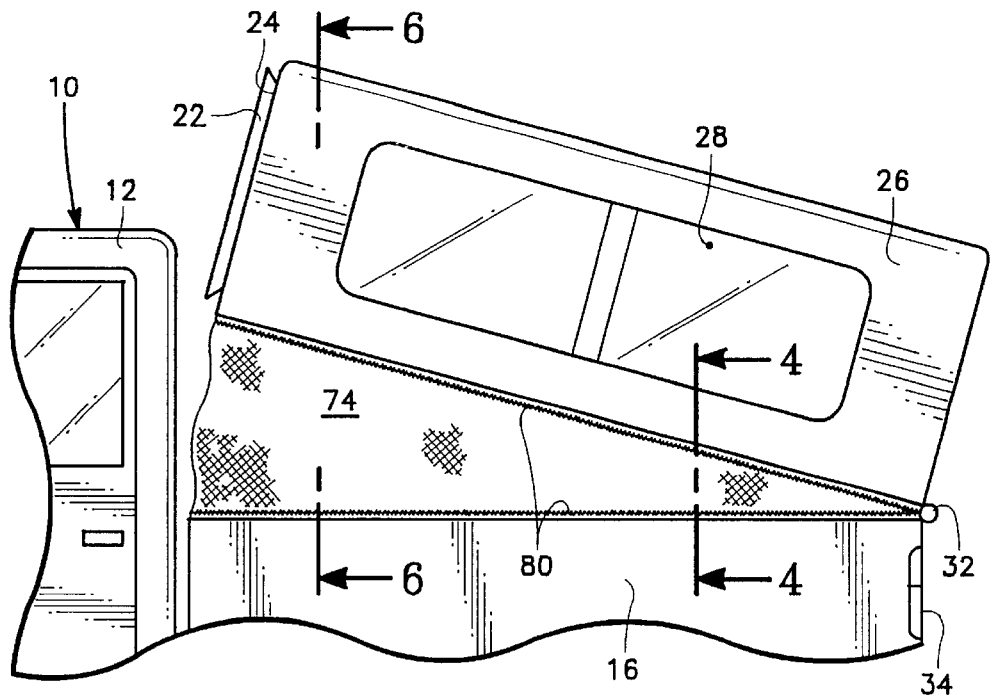
FIG. 3 is a side elevational view similar to FIG. 2 but showing a gap area that is formed inherently by the raising of the camper shell relative to the bed of the pickup truck with this gap area having mounted therein a fabric insert assembly.
Figure 4:
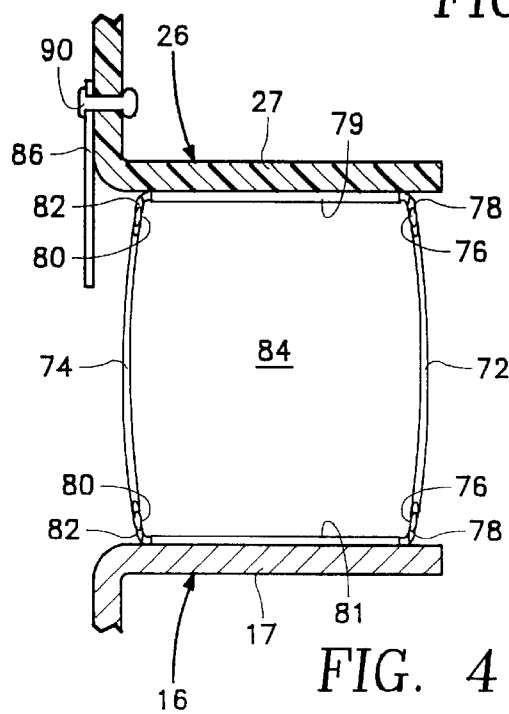
FIG. 4 is a cross-sectional view taken along line 4—4 of FIG. 3 showing the position of the cover relative to the bed of the pickup truck when it is in its maximum raised position.
Figure 5:
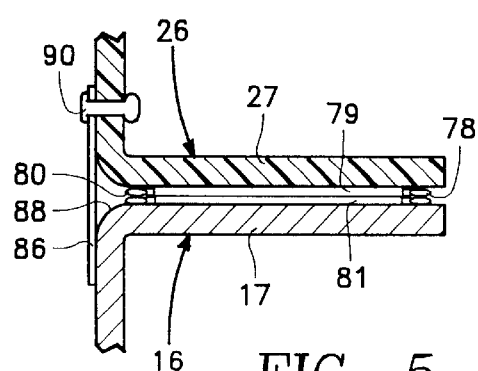
FIG. 5 is a cross-sectional view similar to FIG. 4 showing the position of the cover relative to the bed of the pickup truck when the cover is in the lower position.
Figure 6:
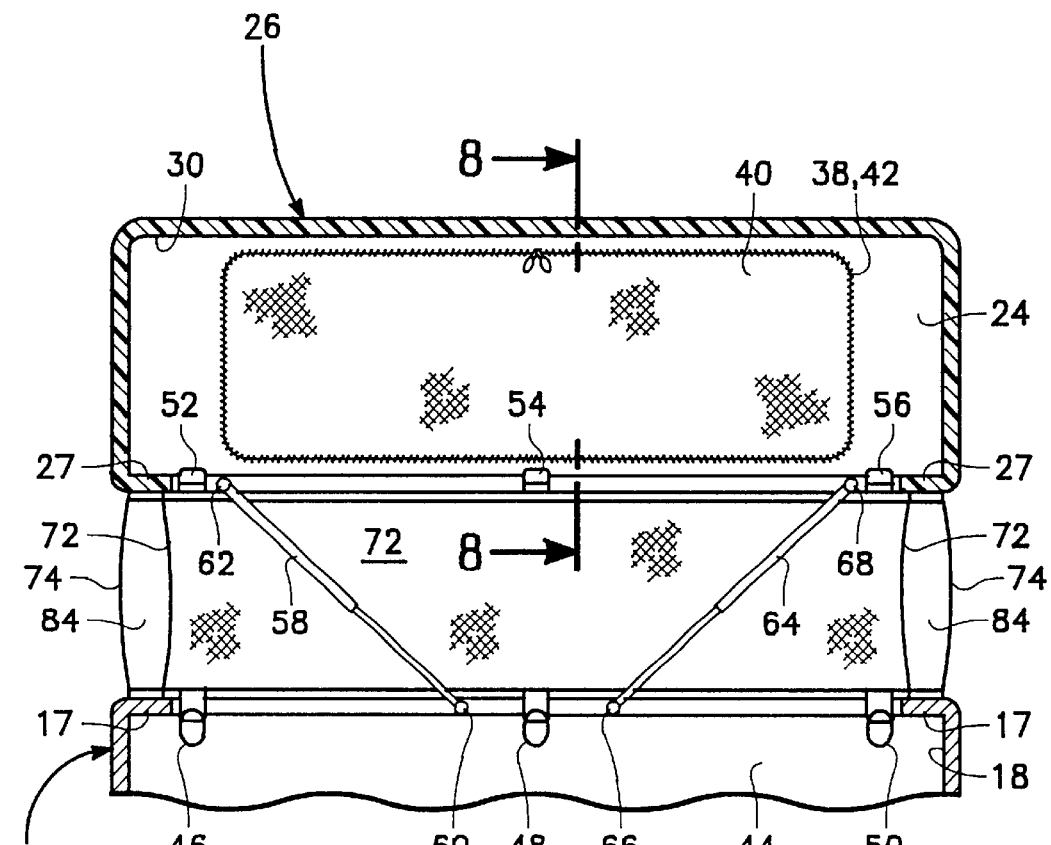
FIG. 6 is a cross-sectional view taken along line 6—6 of FIG. 3 showing the front portion of the cover when it is in the maximum raised position showing the position of the shock struts mounted between the cover and the bed of the pickup truck.

The cover 26 is attached by hinge joint 32 to the tailgate area 34 of the bed 16. When the cover 26 is in the lower position, which is shown in FIG. 1 of the drawings, the flexible boot 22 completely surrounds the window 20. The boot 22 presses and flexes against the rear wall 14 of the cab 12. Mounted on the boot 22 and located entirely around the opening 36 of the boot 22 is a zipper half 38. A fabric insert 40 is formed of a shape that will just enclose opening 36. The peripheral edge of the fabric insert 40 includes a second zipper half 42. When the zipper halves 38 and 42 are entirely engaged, the fabric insert 40 closes off the opening 36 which prevents entry of rain and dust to within the interior chamber 30 of the cover 26. It is to be understood that the fabric insert 40 can be readily unzipped by the zipper halves 38 and 42 in order to remove such when the cover is to be moved to the lower position and the pickup truck driven. The fabric insert 40 is normally utilized when the cover 26 is in the maximum raised position, which is shown in FIGS. 2, 3 and 6 of the drawings.

Figure 8:
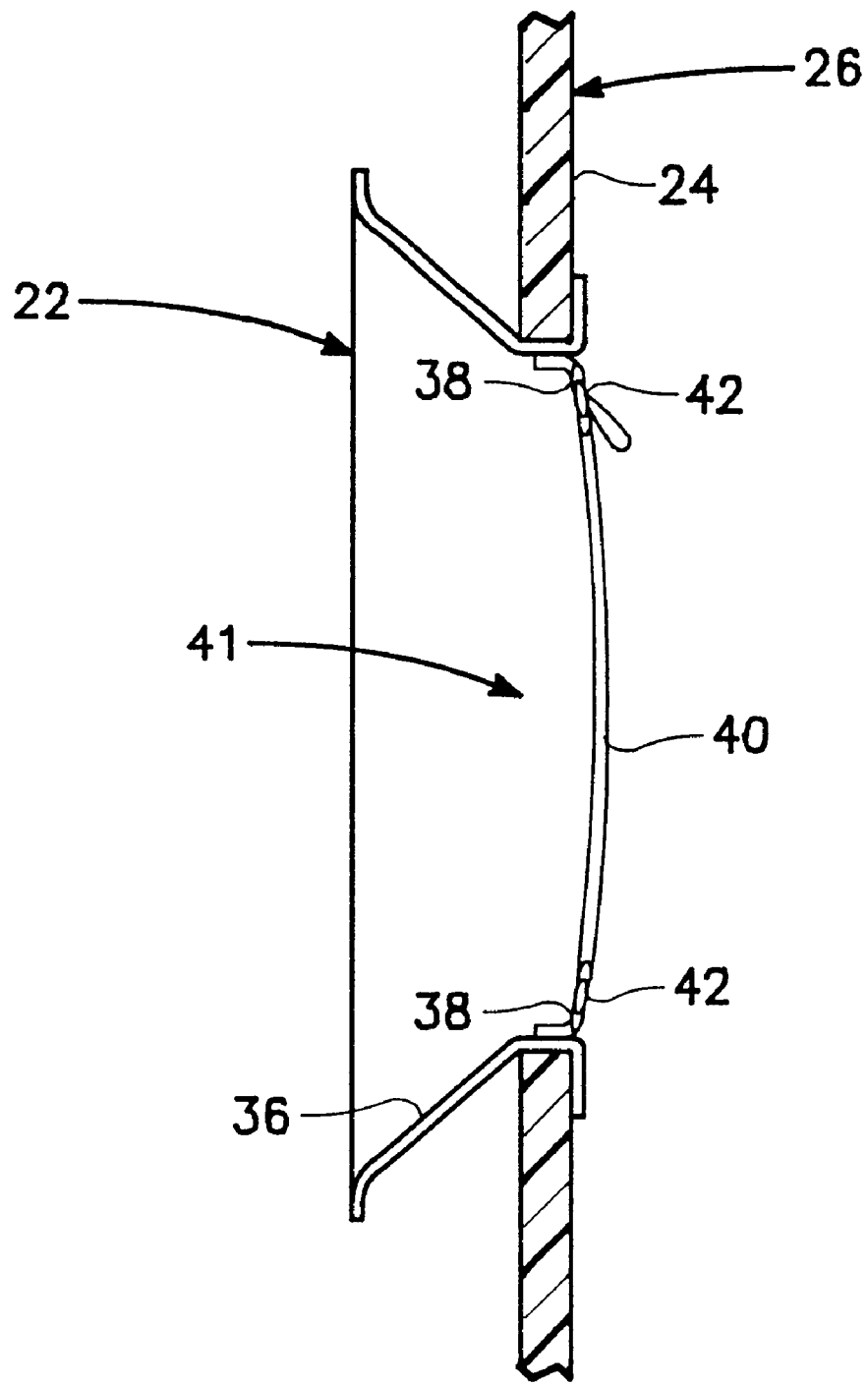
FIG. 8 is a cross-sectional view taken along line 8—8 of FIG. 6 depicting the arrangement in conjunction with the boot that is mounted on the cover.

In FIG. 8, the boot 22 is depicted in relation to the rear wall 14 of the cab 12 for explanatory purposes only. Actually, the boot 22 will be displaced from the rear wall 14 because the cover 26 is in the maximum raised position, which is clearly shown in FIGS. 2 and 3.

Mounted on the forward wall 44 of the bed 16 are a plurality of spaced apart over center latching mechanisms 46, 48 and 50. When the cover 26 is in the lower position, the latching mechanism 46 is to connect with latch plate 52, latching mechanism 48 is to connect with latch plate 54 and latching mechanism 50 engages with latch plate 56. These latching mechanisms 46, 48 and 50 thereby function to secure the cover 26 in the lower position when the pickup truck 10 is being driven. It is to be noted that the latching mechanism 48 and latch plate 54 are located at the transverse middle of the bed 16, the latching mechanism 46 and latch plate 52 are mounted directly adjacent the left side of the bed 16 and latching mechanism 50 and latch plate 56 being mounted directly adjacent the right side of the bed 16. When cover 26 is in lower position, inwardly extending flange 27 rests on upper bed edge 17.

A shock strut 58 has an inner end 60 which is fixedly mounted to the bed 16 directly adjacent latching mechanism 48. The shock strut 58 also has an outer end 62 which is mounted on the cover 26 directly adjacent the latching plate 52. There is also utilized a shock strut 64 which has an inner end 66 which is fixedly mounted onto the bed 16 directly adjacent the latching mechanism 48. The shock strut 64 also has an outer end 68 which is fixedly mounted onto the cover 26 directly adjacent the latch plate 56. The shock struts 58 and 64 are basically identical and each comprise a pair of telescopingly arranged members within which is mounted a spring. The shock struts 58 and 64 always exert a continuous bias tending to extend the struts 58 and 64. The function of the struts 58 and 64 is that when the cover 26 is manually raised after the latching mechanisms 46, 48 and 50 are disengaged from their respective latch plates 52, 54 and 56, that immediately after the exerting of a slight manual force tending to raise the cover 26, the force of the springs and the struts 58 and 64 will assist in this raising movement, and when the cover 26 is in the maximum raised position that the springs within the struts 58 and 64 will be sufficiently strong enough to hold and maintain the cover 26 in this maximum raised position.

When the cover 26 is in the maximum raised position, as shown in FIG. 2, there is formed a gap area 70. In order to prevent the entry of rain, dust and other foreign material as well as to provide privacy to any occupants located within the internal compartment 18, there is to be utilized a fabric insert assembly which is composed of fabric layers 72 and 74. The fabric layer 72 has mounted thereon entirely about its periphery a zipper half 76. The zipper half 76 is to engage with a zipper half 78 which is mounted on both the cover 26 and the bed 16. The size of the fabric layer 72 is to be preselected so that when the cover 26 is in the maximum open position that the fabric layer 26 will completely be located in a taut manner within the width of the gap area 70. The fabric layer 74 also includes a zipper half 80 which is to engage with a zipper half 82 which is also mounted on both the cover 26 and the bed 16. The fabric layer 74 is located outside of the fabric layer 72 therefore fabric layer 74 will be slightly longer than fabric layer 72. Fabric layer 74 also functions to be located in a taut manner across the width of the gap area 70. The reason that the two fabric layers 72 and 74 are used is to provide thermal insulation by forming an air space 84 between the fabric layers 72 and 74. Also, the use of the double layers 72 and 74 provides a further assurance of non-penetration of rain within the internal compartment 18. Zipper halves 78 and 82 are mounted on opposite ends connecting members 79 and 81. Connecting member 79 is fixedly mounted on inwardly extending flange 27. Connecting member 81 is fixedly mounted on upper bed edge 17. Connecting members 79 and 81 generally will comprise a fabric.

When the cover 26 is in the lower position with the bed 16, it will normally be desirable to provide a flap 86 which will cover the joint 88 located between the cover 26 and the bed 16. The flap 86 is to be mounted entirely along the entire length of the joint 88. The flap 86 will normally be mounted by a plurality of rivets 90 to the cover 26.

Figure 7:
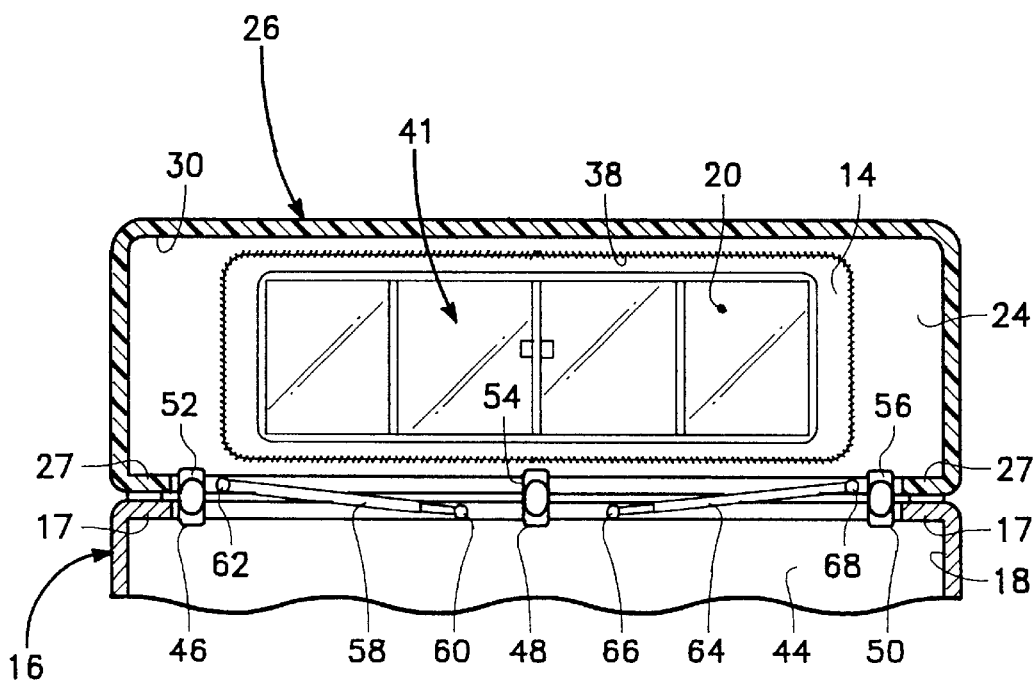
FIG. 7 is a view similar to FIG. 6 but when the cover is in the lower position on the bed of the pickup truck.

It is to be understood that when one wishes to move the cover 26 from the maximum raised position to the lower position it is only necessary that the user merely grab onto the cover 26 and move such depressing of the springs within the shock struts 58 and 64 which will then cause the cover 26 to pivot to the lower position with the shock struts 58 and 64 being compressed, as is shown in FIG. 7.

What is claimed is:

1. An expandable camper shell for a pickup truck, said truck having a passenger cab located forward of a bed, said bed terminating in a tailgate located furthest from said cab, said shell comprising:

a sheet material cover mounted on said truck over said bed enclosing an internal compartment located between said bed and said cover, said cover being pivotally movable by a hinge joint to said bed at said tailgate, said cover having a forward wall located directly adjacent said cab;

at least one shock strut connected between said cover and said bed, said shock strut located at said forward wall, said shock strut permitting manual raising of said cover at said forward wall from a lower position with pivoting occurring at said hinge joint and when located at a maximum raised position said shock strut will hold said cover in said maximum raised position, with said cover in said maximum raised position there is produced a gap area between said cover and said bed; and a fabric insert assembly removably mounted within said gap area, whereby said fabric insert assembly completely encloses said internal compartment.

2. The expandable camper shell for a pickup truck as defined in claim 1 wherein:

there being a second said shock strut connected between said cover and said bed, each said shock strut being elongated and having an upper end and a lower end, each said lower end being connected to said bed near the transverse middle of said bed, said upper end of each said strut being mounted to said cover directly adjacent a side edge of said cover.

3. The expandable camper shell for a pickup truck as defined in claim 1 wherein:

said fabric insert assembly being connected by a zipper to both said cover and said bed.

4. The expandable camper shell for a pickup truck as defined in claim 1 wherein:

said fabric insert assembly comprising a pair of layers with there being an air gap located between said pair of layers.

5. The expandable camper shell for a pickup truck as defined in claim 1 wherein:

the portion of said cab located directly adjacent said bed including a window, said cover including a flexible boot extending exteriorly of said cover, said flexible boot enclosing a window opening which is to surround said window when said cover is in said lower position, a window covering fabric insert to be removably secured by a zipper to said cover in the area of said boot, said window covering fabric insert being designed to completely close said window opening.

6. The expandable camper shell for a pickup truck as defined in claim 1 wherein:

when said cover is in said lower position there being a flap covering a joint that is produced between said cover and said bed that is located exteriorly of said cover and said bed, whereby said flap prevents rain from entering into said joint.

* * * * *